United States Patent Office 3,515,735
Patented June 2, 1970

---

3,515,735
2-(LOWER-ALKOXY)METHYLENE-ANDROSTAN-17β-OL-3-ONES AND PREPARATION THEREOF
Raymond O. Clinton, East Greenbush, N.Y., assignor to Sterling Drug Inc., New York, N.Y., a corporation of Delaware
No Drawing. Filed Apr. 18, 1960, Ser. No. 22,671
Int. Cl. C07c *169/20*
U.S. Cl. 260—397.4                             7 Claims This invention relates to novel steroid compounds and in particular is concerned with 2-(lower-alkoxy)methyleneandrostan-17β-ol-3-ones and the preparation thereof.

The compounds of the invention are represented by the following structural formula

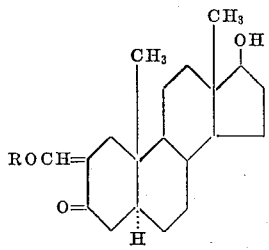

wherein R represents lower-alkyl. The lower-alkyl groups contain from one to about six carbon atoms and thus include such radicals as methyl, ethyl, propyl, isopropyl, butyl, isobutyl, tertiarybutyl, pentyl, isopentyl, hexyl, isohexyl, and the like.

The compounds of the invention are prepared by alkylating 2-hydroxymethyleneandrostan-17β-ol-3-one with a lower-alkanol or the lower-alkyl ester of a strong acid.

2-hydroxymethyleneandrostan-17β-ol-3-one readily reacts with a lower-alkanol at ordinary temperatures in the presence of a trace of a basic or acidic catalyst. The exact nature of the basic or acidic catalyst is not critical. Illustrative basic catalysts are the alkali metal hydroxides or alkoxides; salts of strong bases and weak acids, such as potassium carbonate and sodium acetate, and the like; and organic tertiary amines, such as trimethylamine, triethylamine, pyridine, and the like. Illustrative acid catalysts are the strong mineral acids, such as hydrochloric acid, sulfuric acid, phosphoric acid, and the like; and strong organic acids, such as p-toluenesulfonic acid. The reaction occurs most efficiently under anhydrous conditions.

2-hydroxymethyleneandrostan-17β-ol-3-one also reacts with a lower-alkyl ester of a strong acid in the presence of a base to give the compounds of the invention. The lower-alkyl esters of strong acids are esters of strong inorganic acids such as hydrochloric, hydrobromic, hydriodic and sulfuric acids, or esters of organic sulfonic acids, such as benzenesulfonic acid, p-toluenesulfonic acid, and the like. Thus, illustrative of these lower-alkyl esters of strong acids are methyl iodide, methyl sulfate, ethyl bromide, isopropyl iodide, n-butyl bromide, n-hexyl bromide, methyl p-toluenesulfonate, and the like. The nature of the base employed in the reaction is not critical and can be any of the types described above in connection with the catalysis of the alkylation with the alcohol alone. One molar equivalent or more of the ester and of the base relative to the amount of steroid is used, and the reaction is preferably carried out in an inert solvent under anhydrous conditions at a temperature between about 50° C. and 150° C.

The structure of the compounds of the invention was established by elementary analysis, by the mode of synthesis, and by ultraviolet and infrared spectra determinations.

Endocrinological evaluation of the compounds of the invention has shown that they possess androgenic activity. They are prepared for use in the same manner as known steroidal androgenic agents. The compounds of the invention are also useful as intermediates in the preparation of steroido[3.2-c]pyrazoles and steroido[2.3-d]isoxazoles disclosed respectively in the copending applications of R. O. Clinton, Ser. No. 793,292, filed Feb. 16, 1959, which is a continuation-in-part of application Ser. No. 723,148, filed Mar. 24, 1958, and now abandoned; and R. O. Clinton and A. J. Manson, Ser. No. 39,458, filed June 29, 1960, now U.S. Pat. 3,135,743, which is a continuation-in-part of application Ser. No. 750,289, filed July 23, 1958, and now abandoned.

The following examples will further illustrate the invention without the latter being limited thereby.

EXAMPLE 1

(a) 2-hydroxymethyleneandrostan-17β-ol-3-one

A solution of 50 g. (0.172 mole) of androstan-17β-ol-3-one in 1000 ml. of benzene was placed in a 2-liter, 3-necked flask equipped with a stirrer. The system was flushed out with nitrogen, and 150 ml. of the benzene was removed by distillation. There was then added 26 g. (1.08 mole) of sodium hydride, followed by 40 ml. of absolute methanol, added over a period of fifteen minutes. Finally, there was added 60 ml. of ethyl formate, and the reaction mixture was stirred for about sixteen hours at room temperature. An additional 20 ml. of methanol was added, the mixture stirred for one hour, an equal volume of water added and the mixture again stirred for one hour. The reaction mixture was then filtered and separated into organic and aqueous layers. The aqueous layer was washed with ether, cooled in ice water and acidified with acetic acid. The precipitated product was collected by filtration, redissolved in water containing two equivalents of potassium hydroxide and reprecipitated from the warm solution by slowly adding hydrochloric acid. The precipitated product was collected, triturated with ether and filtered. The ether filtrate upon standing deposited solid material which was collected and dried in vacuo over phosphorus pentoxide for several days and then over potassium hydroxide in a vacuum desiccator to give 50.5 g. of 2-hydroxymethyleneandrostan-17β-ol-3-one, M.P. 135–138° C. (uncorr.).

(b) 2-methoxyethyleneandrostan 17β-ol-3-one

A solution of 0.50 g. of 2-hydroxymethyleneandrostan-17β-ol-3-one in 25 ml. of absolute methanol containing two drops of pyridine was allowed to stand at room temperature for three days. The solution was concentrated to dryness under nitrogen at room temperature, and the residue recrystallized from ether to give 0.24 g. of 2-methoxymethyleneandrostan-17β-ol-3-one in the form of colorless needles, M.P. 203–207° C. (uncorr.). A sample of 2-methoxymethyleneandrostan-17β-ol-3-one when crystallized from methanol had the M.P. 199.2–200.6° C. (corr.), $[\alpha]_D^{25}=+45.6°$ (1% in chloroform); ultraviolet maximum at 277 mμ (E=11,100); infrared maxima at 2.96, 6.02, 6.39, 6.82 and 6.92μ.

*Analysis.*—Calcd. for $C_{21}H_{32}O_3$ (percent): C, 75.86; H, 9.70; $OCH_3$, 9.33. Found (percent): C, 76.12; H, 9.40; $OCH_3$, 9.96.

By replacement of the methanol in the above preparation by an equal volume of ethanol or n-propanol, there can be obtained, respectively, 2-ethoxymethyleneandrostan-17β-ol-3-one or 2-(n-propoxy)methyleneandrostan-17β-ol-3-one.

By replacing the pyridine in the foregoing preparation by a few drops of concentrated hydrochloric acid, the same product, 2-methoxymethyleneandrostan-17β-ol-3-one, is obtained.

EXAMPLE 2

2-isopropoxymethyleneandrostan-17β-ol-3-one can be prepared by the following procedure:

A mixture of 5.85 g. of 2-hydroxymethyleneandrostan-17β-ol-3-one, 5 g. of potassium carbonate, 5.0 ml. of isopropyl iodide and 200 ml. of acetone is refluxed for twenty-four hours in a system protected from moisture. The mixture is then concentrated to dryness, the residue shaken with a mixture of ether and water, and the ether layer separated, washed twice with 5% sodium hydroxide solution and water, dried over anhydrous sodium sulfate and concentrated. The residue is crystallized from ether to give 2-isopropoxymethyleneandrostan-17β-ol-3-one.

By replacement of the isopropyl iodide in the foregoing procedure by a molar equivalent amount of methyl sulfate, ethyl p-toluenesulfonate, n-butyl bromide, or n-hexyl iodide, there can be obtained, respectively, 2-methoxymethyleneandrostan-17β-ol-3-one, 2-ethoxymethyleneandrostan-17β-ol-3-one, 2-(n-butoxy)-methyleneandrostan-17β-ol-3-one, or 2-(n-hexoxy)methyleneandrostan-17β-ol-3-one.

The conversion of 2-methoxymethyleneandrostan-17β-ol-3-one to heterocyclic steroids is illustrated as follows:

A solution of 5.00 g. of 2-methoxymethyleneandrostan-17β-ol-3-one and 0.83 g. of hydrazine hydrate in 200 ml. of 95% ethanol was gradually concentrated on a steam bath to a volume of about 80 ml. over a period of about three hours. The reaction mixture was cooled, and the product which separated was collected by filtration. The 4.16 g. of product obtained was recrystallized successively from an ethyl acetate-benzene mixture, an acetone-ether mixture, benzene and ethanol, and dried in vacuo for several hours giving 17β-hydroxyandrostano[3.2-c]pyrazole containing one mole of ethanol of crystallization, M.P. 127.5–128.5° C. (dec.) (corr.), $$[\alpha]_D^{25} = +55.1° \pm 0.2°$$

(1% in chloroform).

A mixture of 3.18 g. of 2-methoxymethyleneandrostan-17β-ol-3-one, 1.04 g. of hydroxylamine hydrochloride and 150 ml. of glacial acetic acid was stirred for eight hours at 70–80° C. The reaction mixture was cooled to 15° C. and the product separated by the addition of water and filtration of the precipitated product. The product was recrystallized first from methanol and then from acetone and dried at 85–105° C. for sixteen hours to give 17β-acetoxyandrostano[2.3-d]isoxazole, M.P. 164.0–166.0° C. (corr.), $[\alpha]_D^{25} = +39.6 \pm 0.2°$ (1% in chloroform); ultraviolet maximum at 226 mμ (E=4,300).

I claim:
1. 2-(lower-alkoxy)methyleneandrostan-17β-ol-3-one.
2. 2-methoxymethyleneandrostan-17β-ol-3-one.
3. The process for preparing 2-(lower alkoxy)methyleneandrostan-17β-ol-3-one which comprises reacting 2-hydroxymethyleneandrostan-17β-ol-3-one with a lower-alkanol in the presence of a base.
4. The process for preparing 2-(lower-alkoxy)methyleneandrostan-17β-ol-3-one which comprises reacting 2-hydroxymethyleneandrostan-17β-ol-3-one with a lower-alkanol in the presence of an acid catalyst.
5. The process for preparing 2-methoxymethyleneandrostan-17β-ol-3-one which comprises reacting 2-hydroxymethyleneandrostan-17β-ol-3-one with methanol in the presence of an acid catalyst.
6. The process which comprises reacting a 2-lower-alkoxymethyleneandrostan-17β-ol-3-one with hydrazine to form 17β-hydroxyandrostano[3,2-c.] pyrazole.
7. The process which comprises reacting a 2-lower-alkoxymethyleneandrostan-17β-ol-3-one with hydroxylamine in acetic acid to form 17β-acetoxyandrostano[2,3-d]isoxazole.

References Cited

UNITED STATES PATENTS 2,908,693 10/1959 Ringold et al. _____ 260—397.4
2,927,933 3/1960 Babcock et al. ____ 260—397.45

HENRY A. FRENCH, Primary Examiner

U.S. Cl. X.R.

260—999